(12) United States Patent
Bilet et al.

(10) Patent No.: US 9,380,798 B2
(45) Date of Patent: Jul. 5, 2016

(54) CONSTRUCTED NON-DAIRY CREAMS

(75) Inventors: Maxime Jean Jerome Bilet, Bellevue, WA (US); Samuel J. Fahey-Burke, Seattle, WA (US); Nathan P. Myhrvold, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 236 days.

(21) Appl. No.: 13/373,040

(22) Filed: Nov. 1, 2011

(65) Prior Publication Data

US 2012/0121775 A1    May 17, 2012

Related U.S. Application Data

(63) Continuation of application No. 13/373,039, filed on Nov. 1, 2011.

(60) Provisional application No. 61/458,057, filed on Nov. 16, 2010.

(51) Int. Cl.

| | |
|---|---|
| *A23G 9/04* | (2006.01) |
| *A23G 9/32* | (2006.01) |
| *A23D 7/00* | (2006.01) |
| *A23D 7/005* | (2006.01) |
| *A23D 7/01* | (2006.01) |
| *A23D 7/02* | (2006.01) |
| *A23D 7/04* | (2006.01) |
| *A23D 7/05* | (2006.01) |
| *A23L 1/05* | (2006.01) |
| *A23L 1/221* | (2006.01) |

(52) U.S. Cl.
CPC .............. *A23D 7/0053* (2013.01); *A23D 7/011* (2013.01); *A23D 7/02* (2013.01); *A23D 7/04* (2013.01); *A23D 7/05* (2013.01); *A23L 1/05* (2013.01); *A23L 1/221* (2013.01); *A23G 9/04* (2013.01); *A23G 9/32* (2013.01)

(58) Field of Classification Search
USPC ........................... 426/565, 660, 417, 519, 524
See application file for complete search history.

(56) References Cited

U.S. PATENT DOCUMENTS

| | | | | |
|---|---|---|---|---|
| 3,003,882 | A * | 10/1961 | Peat ............................... | 426/565 |
| 4,007,284 | A   | 2/1977  | Goryaev et al. | |
| 4,247,562 | A   | 1/1981  | Bernotavicz | |
| 4,400,406 | A * | 8/1983  | Morley et al. ................. | 426/565 |
| 4,421,778 | A * | 12/1983 | Kahn et al. ..................... | 426/564 |
| 4,539,215 | A   | 9/1985  | Schweid et al. | |
| 4,560,564 | A   | 12/1985 | Bruno, Jr. et al. | |
| 6,086,937 | A   | 7/2000  | Bot et al. | |
| 6,497,913 | B1* | 12/2002 | Gray et al. .................... | 426/565 |
| 6,800,320 | B1* | 10/2004 | Tanaka ........................... | 426/658 |
| 7,205,014 | B2  | 4/2007  | Takebe et al. | |
| 2005/0042333 | A1* | 2/2005 | Bartkowska et al. .......... | 426/101 |
| 2006/0233932 | A1* | 10/2006 | Quail ............................. | 426/565 |
| 2007/0134399 | A1* | 6/2007 | Jarrett ............................ | 426/628 |
| 2007/0298154 | A1  | 12/2007 | Aftoora | |

FOREIGN PATENT DOCUMENTS

JP            06311851 A  * 11/1994  ............... A23G 9/02

OTHER PUBLICATIONS

Arbuckle, Ice Cream 2nd Edition, p. 296 The AVI Publishing Company 1972.*
Navarre, Darlene http://www.youtube.com/watch?v=JmJ-DJ6y82A, Sep. 2009, p. 1.*
Comfy Belly, Creamy Coffee Ice Cream Treat http://comfybelly.com/2009/08/creamy-coffee-ice-cream/#.Uqnr6sX7Lco Aug. 2009, pp. 1-4.*
Adams, Ashley Best Dairy Free Ice Cream Recipes, 2008/2009 http://dairyfreecooking.about.com/od/occasionscollections/tp/bestdairyfreeicecream.htm pp. 1-2.*
Miche "Pistachio Ice Cream", pp. 1-2, Jul. 2003, https://groups.google.com/forum/?hL=en#!search/"pistachio$20oil"$20ice$20cream/rec.food.cooking/iqEE_rO-W4s/IHKvic5MLFAgJ.*
The Nibble pp. 1-8, http://www.thenibble.com/zine/la-tourangelle-nut-oils.asp Oct. 8, 2009 (date obtained from internetarchive.org).*
Igoe et al Dictionary of Food Ingredients 3rd Edition Chapman and Hall 1996, p. 31.*
Brown "Fruity Oil Ice Cream" Food Network p. 1, 2008, http://www.foodnetwork.com/recipes/alton-brown/fruity-oil-ice-cream-recipe.html.*
Lebovitz "Pistachio Gelato Recipe" pp. 1-21 David Lebovitz Sep. 2007 http://www.davidlebovitz.com/2007/09/pistachio-gelat/.*
USDA Basic Reports 01077, 01053, and 04532 printed Feb. 19, 2015 http://ndb.nal.usda.gov/ndb/foods pp. 1-13.*
Spryliving "Uber-Rich, Dairy Free Peanut Butter Ice Cream" pp. 1-2 Sep. 22, 2009 http://spryliving.com/recipes/uber-rich-dairy-free-peanut-butter-ice-cream/.*
Dreena "Cashew Banana Ice Cream" pp. 1-4 May 25, 2008 http://viveleveganrecipes.blogspot.com/2008/05/cashew-banana-ice-cream.html).*
USDA Basic Reports 12118 and 16098 pp. 1-4 http://ndb.nal.usda.gov/ndb/ printed Feb. 2015.*
Avivah; "How to Render Animal Fat"; Oceans of Joy; Feb. 11, 2010; printed on Jul. 25, 2012; located at http:oceansofjoy.wordpress.com/2010/02/11/how-to-render-animal-fat; 2 pages.
Farney, Theresa J.; "the son-in-law also rises"; The Gazette; Jul. 20, 2005; printed on Jul. 25, 2012; located at: http://www.gazette.com/common/printer/view.php?db—colgazette& id-14875 ; 5 pages.
Urell, Andrew; "Pasta with Curry Seafood Sauce"; Bon Appétit; bearing a date of Dec. 2001; printed from: http://www.epicurious.com/recipes/food/printerfriendly/Pasta-with-Curry-Seafood-Sauce-105998 on Jul. 25, 2012; 1 page.
"Demi-Glace Products Special"; GatewayGourmet; Mar. 13, 1998; 1 page; located at https://groups.google.com/forum/?hl=en&fromgroups#topic/rec.food.marketplace/v14acS8k5gk (as cited by Examiner).

(Continued)

*Primary Examiner* — Kelly Bekker

(57) ABSTRACT

A constructed non-dairy ice cream is prepared by making an aqueous emulsion of a flavorful non-dairy fat composition, dispersing an emulsion stabilizer in the aqueous emulsion, warming the stabilized emulsion to a sub-boiling temperature, and then freezing the emulsion to a temperature below a melting point of the flavorful non-dairy fat composition.

1 Claim, No Drawings

(56) References Cited

OTHER PUBLICATIONS

Dictionary of Food Science and Technology (2nd Edition); International Food Information Service; Dec. 3, 2009; cover page and p. 440 (as cited by Examiner); IFIS Publishing.

Igoe et al.; "Dictionary of Food Ingredients—Third Edition"; bearing a date of 1996, created on Dec. 9, 2013; 4 pages; Chapman & Hall.

"Roasted Garlic Onion Sauce"; gatewaygourmet.com; Oct. 6, 2008 (as cited by Examiner); 1 page.

Vogel, Mark R.; "Simmering 101"; FoodReference.com; Feb. 27, 2008; 3 pages; located at http://www.foodreference.com/html/a-simmering-101.html.

"Pistachio Gelato"; Modernist Cuisine; Oct. 11, 2011; pp. 1-5; located at http://modernistcuisine.com/recipes/pistachio-gelato-2/; printed on Feb. 10, 2014.

Chef Depot; "Stocks & Sauces"; Web Archive; Aug. 2, 2002; pp. 1-2; located at: http://web.archive.org/web/20020802125219/hap://www.chefdepot.net/sauces.htm.

Dubois, Sirah; "What Different Acids are in a Tomato?"; Healthy Living; printed by Examiner on Jan. 19, 2015; pp. 1-4; located at: http://healthyliving.azcentral.com/different-acids-tomato-17032.html.

Williams-Sonoma; "Pan-Roasted Shallots with Sherry Wine Glaze"; 1998; printed by Examiner on Jan. 19, 2015; pp. 1-3; located at: htlp://www.williams-sonoma.com/recipe/pan-roasted-shallots-with-sherry-wine-glaze.html.

Chang, Kenneth; "Scientist At Work: Nathan Myhrvold: After Microsoft, Bringing a High-Tech Eye to Professional Kitchens"; The New York Times; bearing a date of Nov. 17, 2009; pp. 1-3.

McLaughlin, Katy, "Trying Sous Vide at Home," located at htip://www.wsj.com/articles/SB122004224561584255, The Wall Street Journal, bearing a date of Aug. 30, 2008, printed on Jul. 27, 2015, pp. 1-9, Dow Jones & Company, Inc.

* cited by examiner

CONSTRUCTED NON-DAIRY CREAMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application claims benefit of priority of U.S. Provisional Patent Application No. 61/458,057, entitled Constructed Creams naming Maxime Bilet et al. as inventors, filed 16 Nov. 2010, which was filed within the twelve months preceding the filing date of the present application, or is an application of which a currently co-pending application is entitled to the benefit of the filing date.

Further, the present application is a continuation of U.S. patent application Ser. No. 13/373,039 entitled Constructed Creams Based on Animal Fats naming Maxime Jean Jerome Bilet, Grant Lee Crilly and Nathan P. Myhrvold as inventors, filed on even date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The present application relates, in general, to culinary science and food preparation technology. In particular, the application relates to constructed creams.

DESCRIPTION

Attention is directed to techniques for making or constructing creams from animal and/or vegetable fats. The constructed creams may include dairy preparations or may exclusively include only non-dairy preparations. Exemplary creams may have exhibit stability over a wide temperature range (e.g., −15° C. to boiling). Exemplary creams may be suitable for preparing and serving as ice creams.

Constructed creams may be prepared using the techniques described herein starting with vegetable-based oils without any animal products. Soy milk and other nut milks are readily available, usually as infusions made from ground nuts or seeds. In contrast, the techniques herein are used to make constructed cream from the oils alone without requiring a high-protein ingredient like soy. The "vegetable-based" constructed creams describe herein may allow individuals to conform to dietary restrictions on use of animal products.

The techniques described herein use suitable emulsifiers to prepare creams based on "vegetable" oils (e.g. hazel nut, virgin olive oil, toasted-sesame seed oil, etc.). With pistachio oil, the techniques are used to prepare a non-dairy ice cream (gelato) with no dairy to get in the way of the pistachio flavor.

Alternatively, the techniques can be used to prepare constructed creams from non-milk animal fat meat (e.g., rendered veal, pork or bacon fat).

In either case of constructed creams based on non-animal or non-dairy fats, it will be understood that the constructed creams may be combined with dairy products for making food servings. For example a pistachio-oil based non-dairy constructed cream may be combined suitable dairy products to make a pistachio flavored dairy-based ice cream.

A newspaper article, Chang, Kenneth; "After Microsoft, Bringing a High-Tech Eye to Professional Kitchens," New York Times, Nov. 17, 2009, is incorporated by reference herein in its entirety.

Dairy creams are natural O/W emulsions composed of droplets of butterfat stabilized with naturally occurring protein emulsifiers. A Modernist chef does not have to limit herself to natural animal milks, because, with a bit of effort and the right emulsifier, any fat can be turned into a "cream." We have made dense, rich creams from flavorful oils such as hazelnut, but something similar works for extra-virgin olive oil, toasted-sesame oil, and other flavorful oils. In the case of pistachios, one can use this technique to make a rich gelato with no dairy to get in the way of the pistachio flavor. Soy milk and other nut milks have been around a long time, usually as infusions made from ground nuts or seeds. The constructed creams are quite different, because they can be made from the oil alone and do not require a high-protein ingredient like soy. One reason to make these constructed creams is to ease past dietary restrictions; if you start with a vegetable-based oil, you can make faux "creams" without any animal products. A very different approach to constructed creams is to make an animal fat "cream" that never passed through a teat. Our veal "cream" uses rendered veal fat with veal stock to create a cream that is much deeper in flavor than dairy cream. Similar creams can be made with rendered pork fat or even bacon fat. Perhaps our favorite emulsion is jus gras. Savory jus and flavorful, rendered fats are emulsified into a stable, meaty sauce with the silky richness of beurre blanc or hollandaise. When made with rendered chicken fat; it is an all-chicken "cream" from an animal that never produced milk. Something similar can be done with fish oils.

In general, constructed creams may be prepared by preparing an aqueous emulsion of oils/fats. Suitable food emulsifiers may be added to a fat/aqueous mixture. Emulsion stabilizers and/or surfactants may be added. Further, tastants (e.g., sugar, salt, acids) may be optionally added. Functional ingredients (e.g. pH controlling agents) also may be optionally added. The mixture may optionally be aged before emulsification. Any suitable technique for emulsifying or homogenizing the mixture (e.g., pressure, ultrasound, or other mechanical technique) may be used to achieve desired fat droplet size distributions (e.g., micron size distributions) for the constructed cream.

A method for preparing a constructed non-dairy ice cream includes, preparing an aqueous emulsion of a flavorful fat composition using suitable food emulsifiers, dispersing an emulsion stabilizer and/or surfactants in the aqueous emulsion, warming the emulsion to temperature substantially less than the boiling point of water, and freezing the emulsion to a temperature below a melting point of the flavorful fat composition.

A method for preparing a constructed non-dairy cream, includes dry blending a mixture of food agents, dispersing the mixture into cold water (e.g., to prepare a hydrocollodial system), warming the water-dispersed mixture to a temperature substantially less than the boiling point of water, combining a flavorful fat composition to the water-dispersed mixture and emulsifying the combination, and reserving the emulsified combination for later use as a cream. A suitable surfactant may be optionally added to the mixture at any stage.

A method for preparing a constructed cream includes combining a water and flavorful oil/fat, adding tastants (e.g., sugars, salts, acids), adding an emulsifier or combination of emulsifiers, an emulsion stabilizer such as a hydrocolloid, and optionally a suitable surfactant. The combination is heat treated either before or after mechanical emulsification to achieve pasteurization and to hydrate the hydrocolloid stabilizers as necessary. The combination can be reserved for later use.

A method for preparing a constructed animal fat cream includes preparing cooked animal stock or jus, dispersing a mixture of food agents into the jus, combining a rendered animal fat composition to the jus-dispersed mixture and emulsifying the combination, and reserving the emulsified combination for later use as a cream. The method may optionally include adding an emulsifier and/or hydrocolloid stabilizer to the mixture at any suitable stage, and may involve warming or heating the preparation at suitable intermediate stages.

The following EXAMPLES I-III illustrate preparation and composition of exemplary constructed creams.

EXAMPLE I

Pistachio Gelato
Yields: 1.1 kg

| Ingredient | Quantity | Scaling | Procedure |
| --- | --- | --- | --- |
| Water | 680 g | 100% | 1. Blend together until smooth. |
| Pistachio butter | 210 g | 30.8% | |
| Sugar | 155 g | 22.8% | |
| Pistachio oil | 102 g | 15% | |
| Locust bean gum | 3 g | 0.44% | 2. Dry blend and disperse into pistachio mixture. |
| Lambda carrageenan | 2 g | 0.3% | 3. Warm to 60° C./140° F. |
| Polysorbate 80 | 0.8 g | 0.12% | 4. Homogenize until very smooth and cool. |
| Glycerol monostearate | 0.15 g | 0.02% | 5. Churn and reserve in freezer, or freeze in Pacojet container and pacotize for service. |

EXAMPLE II

Hazelnut Cream
Yields 350 g

| Ingredient | Quantity | Scaling | Procedure |
| --- | --- | --- | --- |
| Water | 250 g | 100% | 1. Dry blend hydrocolloids. |
| Tapioca starch | 11.2 g | 4.48% | 2. Disperse into cold water. |
| Whey protein isolate | 6 g | 2.4% | 3. Homogenize thoroughly with commercial blender or rotor-stator homogenizer, if available |
| Acetic acid | 0.5 g | 0.2% | |
| Polysorbate 80 | 0.4 g | 0.16% | 4. Warm to 85° C./185° F., and hold mixture and temperature. |
| Xanthan gum | 0.16 | 0.06% | |
| Roasted hazelnut oil | 80 g | 32% | 5. Warm oil to 85° C./185° F. |
| | | | 6. Drizzle into hot water mixture while shearing at full speed, until fully emulsified. |
| | | | 7. Cool hazelnut cream. |
| Salt | to taste | | 8. Season cream and vacuum seal. |
| | | | 9. Refrigerate until use. |
| | | | 10. Can be served hot or cold. |

EXAMPLE III

JUS GRAS
Yields 280 g

| Ingredient | Quantity | Scaling | Procedure |
| --- | --- | --- | --- |
| Shallots, minced | 80 g | 40% | 1. Sauté shallots until golden, about 5 min. |
| Neutral oil | 20 g | 10% | |

-continued

JUS GRAS
Yields 280 g

| Ingredient | Quantity | Scaling | Procedure |
| --- | --- | --- | --- |
| Fino sherry | 100 g | 50% | 2. Add to pan of sautéed shallots. |
| White port (dry) | 50 g | 25% | 3. Reduce mixture to glaze. |
| Brown chicken stock | 450 g | 225% | 4. Combine with glaze in pot. |
| Sous vide chicken juice | 200 g | 100% | 5. Reduce to 200 g and strain. |
| Reduced chicken stock, from above | 200 g | 100% | 6. Mix to form jus. |
|  |  |  | 7. Incorporate fully with rotor-stator homogenizer or by other method. |
| Propylene glycol alginate (Protanal Ester BV 4830, FMC BioPolymer brand) |  | 0.3% |  |
| Liquid soy lecithin (NOW brand) |  | 0.2% |  |
| Xanthan gum |  | 0.2% |  |
| Rendered chicken fat, or butter, melted | 80 g | 40% | 8. Drizzle slowly into jus, blending constantly to emulsify, as for mayonnaise. |
| Salt | to taste |  | 9. Season. |
| Lemon Juice | to taste |  |  |

(% of total combined weight of reduced chicken stock and rendered chicken fat)

The methods and compositions described herein may be used to prepare heat stable constructed creams (e.g., creams that are stable over a wide temperature range from about −15 C to about boiling).

It will be understood that the descriptions of various aspects and embodiments of the subject matter disclosed herein are for purposes of illustration only, and are not intended to be limiting the true scope and spirit of this disclosure.

The invention claimed is:

1. A method for preparing a frozen pistachio mixture, consisting of:
    blending until smooth a pistachio mixture of approximately [1×] 100 grams of water, approximately 30.8[×] grams of pistachio butter per 100 grams of water, approximately 22.8[×] grams of sugar per 100 grams of water, and approximately 15[×] grams of pistachio oil per 100 grams of water;
    dry blending approximately 0.44[×] grams of locust bean gum per 100 grams of water, approximately 0.3[×] grams of lambda carrageenan per 100 grams of water, approximately 0.12[×] grams of polysorbate 80 per 100 grams of water, and approximately 0.02[×] glycerol monostearate per 100 grams of water;
    dispersing the dry blend ingredients into the pistachio mixture to form a resulting mixture;
    heating the resulting mixture to approximately 60° C. to form a warmed mixture;
    homogenizing the warmed mixture until smooth; churning the warmed homogenized mixture; and
    freezing the churned mixture.

\* \* \* \* \*